H. W. BERTRAM & F. L. LAMOREAUX.
WIND SHIELD FOR VEHICLES.
APPLICATION FILED JUNE 25, 1909.
957,541.
Patented May 10, 1910.
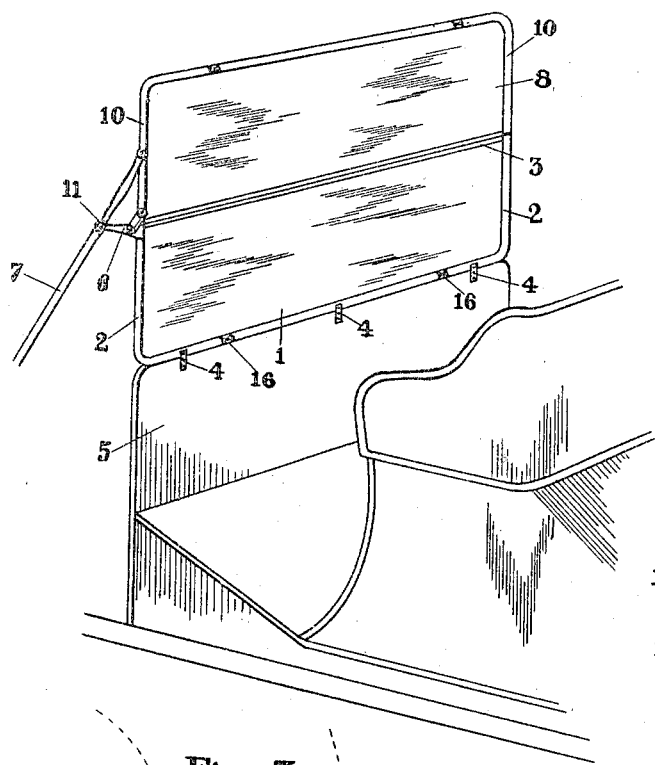
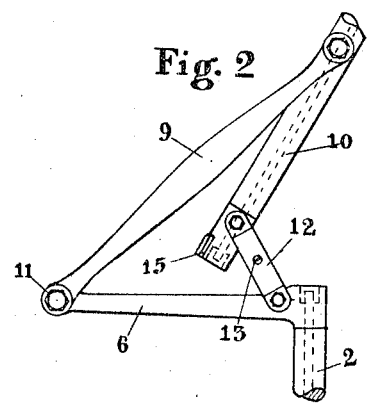
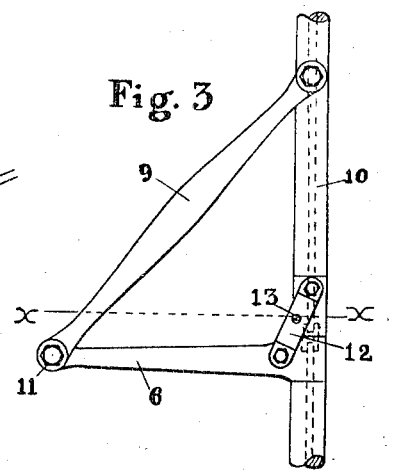
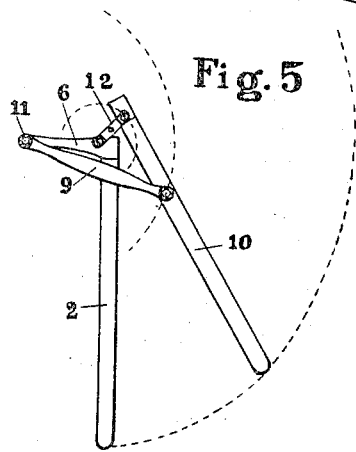
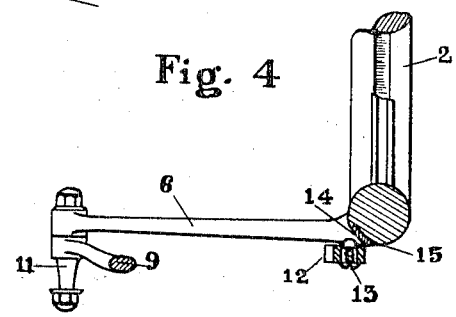
WITNESSES:
INVENTORS
HENRY W. BERTRAM
FRANK L. LAMOREAUX
BY
ATTORNEYS

UNITED STATES PATENT OFFICE.

HENRY W. BERTRAM AND FRANK L. LAMOREAUX, OF DETROIT, MICHIGAN, ASSIGNORS TO STANDARD AUTO ACCESSORY MFG. CO., OF DETROIT, MICHIGAN, A CORPORATION OF MICHIGAN.

WIND-SHIELD FOR VEHICLES.

957,541.          Specification of Letters Patent.     Patented May 10, 1910.

Application filed June 25, 1909. Serial No. 504,251.

*To all whom it may concern:*

Be it known that we, HENRY W. BERTRAM and FRANK L. LAMOREAUX, citizens of the United States of America, residing at Detroit, in the county of Wayne and State of Michigan, have invented certain new and useful Improvements in Wind-Shields for Vehicles, of which the following is a specification, reference being had therein to the accompanying drawings.

This invention relates to a wind shield for automobiles wherein two rigid sections of equal height are articulated by means which automatically lock them together in extended position without the use of tightening nuts or clamps.

The invention consists in the matters hereinafter set forth, and more particularly pointed out in the appended claims.

In the drawings, Figure 1 is a view in perspective of the dash of an automobile equipped with a wind shield embodying features of the invention. Fig. 2 is a view in detail of connecting members and joints, showing the parts about to be closed in extended position. Fig. 3 is a similar view showing the same parts in closed position. Fig. 4 is a view in cross-section on line $x$—$x$ of Fig. 3. Fig. 5 is a view partially diagrammatic showing the path of travel of the upper section.

Referring to the drawings a rectangular frame 1 preferably formed of a single channeled rod 2 bent to form the bottom and ends of the rectangle and closed by a top channel 3 is secured by suitable clips 4 on an automobile or vehicle dash 5.

Horizontal arms 6 extend forward from the upper corners of the frame 1 and are fitted at their ends for braces 7 running to the front of the vehicle in the usual manner. An upper rectangular frame 8 corresponding to the lower frame 1 in size is secured thereto in inverted position by an outer pair of links 9 pivoted at their upper ends to the side bars 10 of this frame at some distance above their lower ends and at their lower ends to studs 11 on the arms 6 which are likewise utilized to secure the brace rods 7. A pair of short coupling bars 12 are likewise pivoted each with its upper end a short distance above the lower extremity of the rod 10 and with its lower end to the horizontal arm 6 a short distance from the side bar 2, the parts being so disposed that the frame 10 may be swung into vertical alinement with the frame 1, the proximate ends of the side rods of the frame being in abutting relation with the coupling bars 12 crossing the frame obliquely so that a spring plunger 13 in each coupler is adapted to bear against an oblique face 14 on the frame 10 and crowd the foot of the frame closely into place. As the shield frame is usually of brass or steel, plates 15 of steel are preferably inserted in the standards 10 to form the faces 14.

The parts are so proportioned that the shield may be broken down by pulling on the top of the sash 10 so that the latter swings on the double centers afforded by the links and coupling bars in parallel relation to the frame 1, spring clips 16 locking the frame in lowered position. By this method of construction, the path traveled by the upper edge of the upper frame is such as to nicely clear a steering wheel, the arc not being circular as in the case of a single pivot joint. This permits the division of the shield in two equal sections so that the cross bars are well below the eyes of the operator of the vehicle and does not impede his vision as is the case with the usual construction wherein the upper section is necessarily short in order to clear the steering wheel when it is folded down. Another feature is the fact that there are no projections on side rods of the shield inwardly toward the seat or laterally so that a person can enter the vehicle without being interfered with.

Obviously, changes in the details of construction may be made without departing from the spirit of the invention, and we do not care to limit ourselves to any particular form or arrangement of parts.

What we claim as our invention is:—

1. A wind shield comprising a lower frame adapted to be rigidly secured in upright position on a vehicle, an upper frame corresponding to the lower frame, a pair of bracket arms extending forward from the upper corners of the lower frame, links pivoted each at one end to the outer end of an arm and at the other to the upper frame between the corners thereof, coupling bars each pivoted at its outer end to an arm between its lower corners and the link pivot, and a spring projected member on each coupling bar adapted to bear obliquely against the end of the upper frame when the latter is alined with and resting on the lower frame, said parts being disposed to lock the frames in vertical alinement one on the other and to move the upper frame into parallel relation with and against the lower frame when the upper frame is dropped.

2. A wind shield comprising a lower substantially rectangular frame adapted to be rigidly secured in upright position in a vehicle, an upper frame corresponding to the lower frame, a pair of arms rigidly extending from the upper corners of the lower frame, a pair of links articulating the ends of the arms and the end members of the upper frame between the ends of the latter, a pair of coupling bars pivoted at their upper ends to the end members of the upper frames between the lower corners of the latter and the links and a spring plunger in each coupling bar adapted to bear against an outwardly oblique face on the adjacent end member of the upper frame when the frames are superposed.

In testimony whereof we affix our signatures in presence of two witnesses.

HENRY W. BERTRAM.
FRANK L. LAMOREAUX.

Witnesses:
C. R. STICKNEY,
A. M. DORR.